United States Patent [19]

Bravin

[11] Patent Number: 4,653,630
[45] Date of Patent: Mar. 31, 1987

[54] METHOD OF AND DEVICE FOR CONTROLLING THE TRANSFER OF ARTICLES FROM A FIRST CONVEYOR BELT TO PREDETERMINED LOCATIONS ON A SECOND CONVEYOR BELT

[76] Inventor: Anna Bravin, Via Cesare Battisti 4, Rivoli, Torino, Italy

[21] Appl. No.: 668,136

[22] Filed: Nov. 5, 1984

Related U.S. Application Data

[63] Continuation-in-part of Ser. No. 463,647, Feb. 3, 1983, abandoned.

[51] Int. Cl.[4] .............................................. B65G 47/26
[52] U.S. Cl. ..................................... 198/460; 198/577
[58] Field of Search ............... 198/460, 461, 462, 572, 198/575, 577, 579

[56] References Cited

U.S. PATENT DOCUMENTS

| | | | |
|---|---|---|---|
| 3,075,630 | 1/1963 | Fisk | 198/460 X |
| 3,335,841 | 8/1967 | Klingel et al. | 198/460 |
| 3,490,687 | 1/1970 | Bowman | 198/460 X |
| 4,197,935 | 4/1980 | Aterianus et al. | 198/460 |
| 4,360,098 | 11/1982 | Nordstrom | 198/460 X |
| 4,364,766 | 12/1982 | Nitschke | 198/460 X |
| 4,514,963 | 5/1985 | Bruno | 198/460 |

FOREIGN PATENT DOCUMENTS

| | | | |
|---|---|---|---|
| 2346407 | 3/1974 | Fed. Rep. of Germany | 198/460 |
| 54-358 | 1/1979 | Japan | 198/460 |
| 1593847 | 7/1981 | United Kingdom | |
| 655299 | 3/1979 | U.S.S.R. | 198/460 |

Primary Examiner—Joseph E. Valenza
Attorney, Agent, or Firm—McGlew and Tuttle

[57] ABSTRACT

In a group of conveyor belts feeding articles to a manipulating machine, articles on a first belt are to be transferred to predetermined locations on a second belt. To obviate to incorrect positioning of an article on a first belt with respect to the second belt, affecting the transfer regularity, a digital signal representing the position of the second belt is stored whenever an article arrives on the first belt. An error signal is obtained from the stored signal whenever an incorrect positioning is detected, and is fed to members controlling the motion of the first belt to temporarily correct the belt speed and hence the position of the article with respect to the second belt. At each adjustment, the error signal is progressively reset by feedback signals.

17 Claims, 4 Drawing Figures

METHOD OF AND DEVICE FOR CONTROLLING THE TRANSFER OF ARTICLES FROM A FIRST CONVEYOR BELT TO PREDETERMINED LOCATIONS ON A SECOND CONVEYOR BELT

The present Application is a continuation-in-part of application Ser. No. 463,647 filed on Feb. 3, 1983, now abandoned.

FIELD OF THE INVENTION

The present invention relates to a method of and a device for controlling the transfer of substantially identical articles (or of articles having at least substantially the same length) from a first continuously moving conveyor belt to predetermined locations on a second continuously moving conveyor belt.

BACKGROUND OF THE INVENTION

In several industrial fields, article manipulating machines, for instance packing machines, are used which comprise a feeding group consisting of a chain of conveyor belts, arranged one after the other, which receive the articles from a production station, suitably space them apart and supply them to a final belt provided with equally spaced, outward projecting transversal teeth, defining a continuous succession of recesses each intended to receive an article and to deliver it to the packing machine. Said final belt moves at a speed given by the packing machine, while the preceding belts and particularly the spacing belt(s) can be driven by their own motors. In any case, the speed of said spacing belt(s) is related to that of the final belt, in order that the articles are positioned on the spacing belt(s) so as to be properly received by said recesses.

As the operation of the production station is independent of that of the feeding group, the articles arrive at random instants on the spacing belt(s) so that the article position relative to the recesses may require adjustment: in effect, in order that the article manipulating machine operates properly, the articles must be located within the recesses in a well defined position, with rather narrow tolerance margins.

OBJECT OF THE INVENTION

It is an object of the invention to provide a method of and a device for controlling the transfer of an article in the proper position in one said recess, by adjusting if necessary the article position on the or a spacing belt, that adjustment being obtained by means of an intervention on the members controlling the motion of (a) said belt.

SUMMARY OF THE INVENTION

According to the invention, there is provided a method of controlling the transfer of articles from a first (upstream) continuously moving endless conveyor belt to selected locations of a second (downstream) continuously moving endless conveyor belt, the method comprising the steps of: detecting the arrival of an article onto the first upstream belt, generating a digital signal representing a position of the second downstream belt, storing said digital signal whenever the arrival of an article onto the upstream belt is detected, converting the stored signal into an error signal whenever it represents a position different from a predetermined position ensuring the correct transfer of an article into one of said predetermined locations, sending said error signal to members controlling the motion of the upstream belt in order to temporarily adjust the speed thereof and hence correcting the article position with respect to the downstream belt, and generating at each adjustment of the speed of the upstream belt a digital feedback signal in order to progressively annul said error signal while the article position is being progressively corrected.

The error signal may directly act on the control members of a motor driving the upstream belt, which members also receive a signal representing the speed of the downstream belt. According to an embodiment in which the upstream belt is driven by the downstream belt through a differential gear, the error signal may start a motor connected with the shaft of a bell member carrying the planet gears of the differential.

The error signal may be obtained by converting into analog form and subsequentially amplifying a signal obtained as the algebraic sum of the stored signal and of the feedback signal. That signal may be the output signal of an up-down counter which is reset whenever the arrival of an article on the first belt is detected and counts forward and backward pulses representing the displacement of the second and the first belt, respectively, when the two belts are driven by independent motors. When said motor actuating the bell is provided, the counter may count forward or backward signals representing the displacement of said motor or of the bell shaft in either direction.

In an embodiment in which said bell actuating motor is a step by step motor, the error signal may consist of a pulse train which is fed to said motor whenever the stored value represents a position different from said predetermined position.

The device carrying out the method of the invention comprises:

a detector associated with the first belt to detect the arrival of an article thereto;

a first signal generator associated with the second belt and emitting digital signals representing the position of said second belt;

memory means, having a data input connected to said first generator and an enable input connected to said detector, said memory unit storing the signal emitted by the first signal generator when at its enable input there is present a signal emitted by said detector and indicating the arrival of an article onto the first belt;

error signal generating means connected to said memory unit for receiving therefrom the digital signal stored, for recognizing on the ground of said digital signal an incorrect position of an article on the first belt, for generating, in case of an incorrect position, an error signal and for sending said error signal to members for controlling the motion of the first belt; said error signal causing a temporary adjustment of the speed of the first belt in a manner tending to recover the correct article position; and means for generating, at each adjustment of the speed of the first belt, a feedback signal progressively annulling said error signal while article position is being corrected.

BRIEF DESCRIPTION OF THE DRAWINGS

The invention will be better explained with reference to the accompanying drawings in which.

SPECIFIC DESCRIPTION

Figure 1:
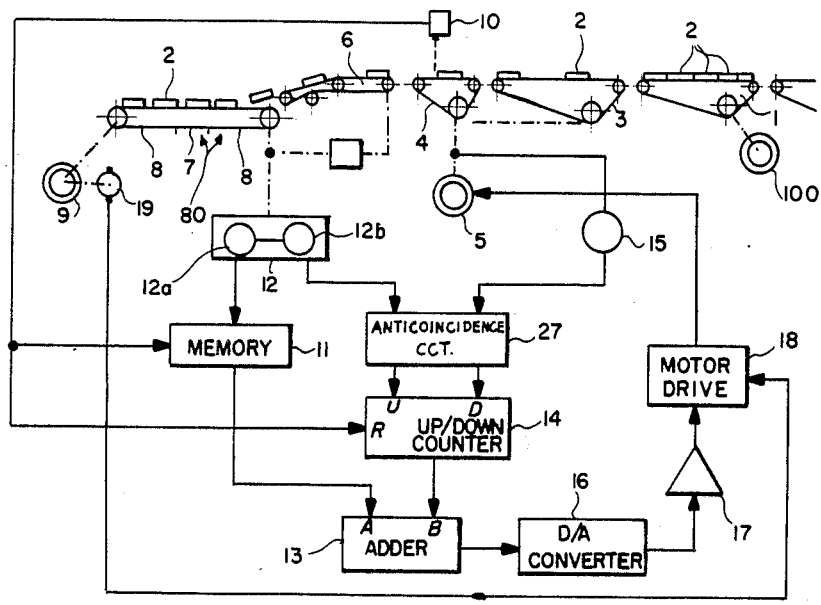
FIG. 1 schematically shows the feeding group of packing machine equipped with a first embodiment of the invention.

In FIG. 1, a first endless conveyor belt is continuously driven by a motor 100 and conveys mutually contacting articles 2 having substantially the same length, supplied e.g. by a manufacturing station. The articles are spaced apart by one or more other conveyor belts, for instance two belts 3, 4 driven by a motor 5, which in the embodiment of FIG. 1 is a low-inertia d.c. motor. Belt 4 is followed by a further belt 6 which is to forward the product pieces to a final belt 7 delivering the pieces to the packing machine of to another machine which is to handle individual pieces. Belt 6 is driven by belt 7, as shown in the Figure.

The surface of belt 7 has equally spaced transversal teeth 8 which define on the surface itself recesses 80 intended to receive each a product piece 2. Belt 7 is exacty synchronized with the packing machine, of which only motor 9 is shown.

In order to speed up the transport from the manufacturing station to the packing one, the speed of belt 4 may be higher than, for instance multiple of that of belt 7. The two speeds are however to be kept linked so that the articles might be properly transferred to recesses 80 in belt 7. Irregularities in the operation of the packing machine are thus avoided.

The invention is to ensure such a correct transfer of the articles, even in case they arrive irregularly onto belt 4.

To this end, a photoeletric cell 10 or another device apt to detect the arrival of an article 2 is arranged in correspondence with belt 4. Belts 4 and 7 are moreover associated with angular position detectors or signal generators 12, 15. These devices generate digital signals which are fed to logical circuits, described later on, intended to obtain therefrom an error signal whenever an article 2 on belt 4 at a fixed location between the upstream and downstream ends of belt 4 is not in a correct position for being received by a recess 80. The error signal is sent to control members 18 of motor 5 of belt 4 to temporary adjust the speed thereof in either direction, according to whether a lag or a lead has occurred in the arrival of the article. Such logic circuits are also to generate a feedback signal which progressively annuls the error signal while the piece position is being progressively corrected.

The position detector associated with belt 7 is composed of two separate sections 12a, 12b, which are both mounted on the shaft of a driving wheel of belt 7, in such a way that every step of belt 7 moving a recess to a position suitable for receiving an article 2, corresponds to a revolution or a fraction of a revolution of the two sections of the position detector. By way of an example, each step of the belt will be assumed to correspond to a revolution of both sections.

Said two sections 12a, 12b may consist of an absolute and an incremental optical encoder respectively.

Absolute encoder 12a generates a digital signal which represents, in coded digital form, the angular position of the shaft on which it is mounted, and hence the position of belt 7. Each revolution of encoder 12a is divided into a number of steps depending on the minimum error to be corrected, taking obviously into account the sensibility of control members 18 of motor 5. A subdivision into 256 steps will be considered by way of example. As the invention aims to correct both leads and lags in the arrival of the articles on belt 4, encoder 12a will be advantageously mounted so as to indicat the correct position of a recess 80 relative to an article 2 on belt 4 (i.e. a relative position of a recess and an article such that the latter can be properly received in the recess) in correspondence of its central step (for instance, step 128 if the 256 steps are numbered 0 through 255). That correct position will be indicated by encoder 12a when an article, whose position does not require corrections, passes in correspondence of photocell 10.

The output signal of encoder 12a is fed to a memory device 11, in particular a latch, which is enabled by the signal generated by photocell 10 at the passage of an article.

Also the revolution of the incremental encoder 12b is subdivided into a number of steps, which by way of example is assumed to be the same as that of absolute encoder 12a. Section 12b generates at each step a pulse which is fed to the input for forward counting of an up-down counter 14. Said counter is reset by the signal emitted by photocell 10 at the passage of an article and receives at the input for backward counting the pulse generated by angular position detector 15 associated with belt 4. Encoder 15 is an incremental encoder like encoder 12b. Each revolution of encoder 15, in the absence of corrections of the speed of belt 4, corresponds to a revolution of encoder 12b and is divided into an equal number of steps, so that the two encoders emit pulses at the same rate.

Figure 2:
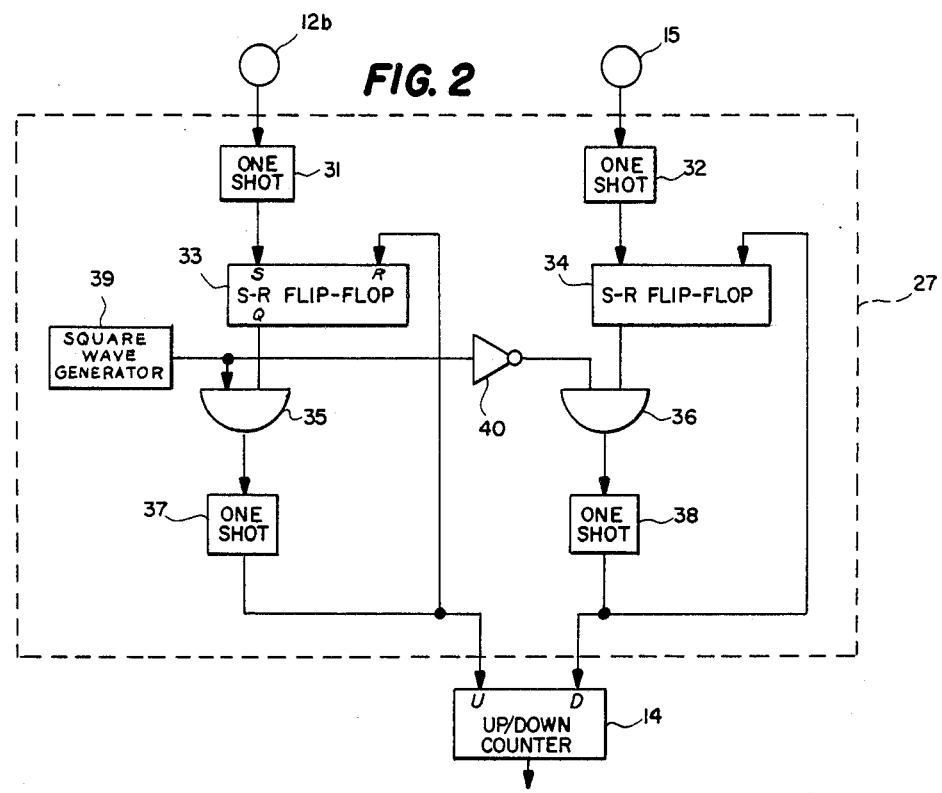
FIG. 2 is an exemplary diagram of an anticoincidence circuit employed in the embodiment of FIG. 1.

Of course, in order that none of the pulses emitted by the incremental encoders are lost, such pulses must not simultaneously occur at the two inputs of counter 14: this may be achieved through an anticoincidence circuit 27, whose structure is shown in FIG. 2. In these conditions the output signal of counter 14 will continuously oscillate between value $+1$ or $-1$, depending on which input is actuated first, and value 0. In case of an adjustment of the speed of belt 4, the pulses at one counter input will have an higher rate and therefore the count of counter 14 will progressively increase or decrease according to the sign of the adjustment. The signal representing said count is a feedback signal intended to progressively annul the error signal which has caused the speed adjustment.

The outputs of latch 11 and counter 14 are connected to the inputs, denoted by A, B, of a full-adder 13 which carries out the algebraic sum of the input signals. The output of adder 13 is connected to a digital-to-analog converter 16 generating bipolar output signals forming the possible error signal. More particularly, converter 16 will emit a null signal when the output signal of adder 13 has a value corresponding to the correct position of the articles with respect to recesses 80 (value 128 with the assumptions made) and a positive or negative signal in the other cases. The output of converter 16 is connected through an amplifier 17 to control members 18 of motor 5, which also receive a signal representing the speed of belt 7; said signal is taken from motor 9 through a tachometer 19 and is algebraically added to the error signal, if any, issuing from amplifier 17.

It is to be taken into account that the output signals of adder 13 and converter 16 present the same oscillation as the output signal of counter 14; thus an adjustment of the article position on belt 4 by an amount equal to 1/256 of a step might possibly be effected even in the absence of irregulaties. Yet, the linear sizes of recesses 80 are longer enough than those of articles 2, in order to allow launching of the articles by belt 6 and incorrect position recovery, so that an adjustment by such an amount has no practical effect.

The devices shown in the drawings as blocks are well known to the skilled in the art and are commercially available. The following is a list of suitable commercial devices:

encoder 12a: encoder 23 DOB 197 manufactured by Moore Reed & Co.

encoders 12b, 15: encoder 35 OP 103 manufactured by Moore Reeds & Co.

latch 11: component 7475 made by Texas Instruments.

counter 14: Texas Instruments 74193.
full-adder 13: Texas Instruments 7483A
converter 16: Analog Device AD 559.
amplifier 17: Texas Instruments $\mu_A$ 741
control members 18: transistor drive PWME $110 \times 8/16$ manufactured by SOPREL.

FIG. 2 shows a possible embodiment of anticoincidence circuit 27. The outputs of incremental encoders 12b, 15 are connected to inputs of one-shot circuits 31 and 32, respectively, which convert the signal arriving from the encoders into pulses of short duration (for instance 0.1 $\mu$s). The outputs of one-shot circuits 31, 32 are connected to the set inputs of respective set-reset flip-flops 33, 34 whose outputs are connected, through respective AND gates 35, 36 and one-shot circuits 37, 38 (identical with one-shots 31, 32) to the inputs for forward or backward counting of counter 14. AND gate 35 receives at a second input the signals generated by a square wave generator (for instance generator CD 4047 manufactured by RCA). The same signals, inverted by inverter 40, are fed to a second input of AND gate 36. The outputs of one-shots 37, 38 are further connected to reset inputs of flips-flops 33, 34. The signals emitted by generator 39 have advantageously a rate rather high with respect to the rate of the pulses emitted by encoder 12a, 15 (typical rates being 1 MHz for generator 39 and 10 KHz for the encoders) and a pulse duration much greater than that of the pulses issuing from one-shot circuits 31, 32, 37, 38. In this way none of the pulses arriving from an encoder is lost and no pulse superposition occurs at the set and reset inputs of the flips flops. It is evident that the arrangement shown in FIG. 2 allows the attainment of the desired aim, as inverter 40 prevents simultaneously enabling of AND gates 35, 36 and hence the counter inputs are alternately actuated.

The operation of the device shown in FIG. 1 will now be described. In such a description, the oscillation by 1 unit of the output signals of counter 14 and adder 13 due to the alternance of the signals at the counter inputs will be neglected for sake of simplicity.

When an article on belt 4 passes in correspondence with photocell 10, latch 11 is enabled to present at its output the value of the position of belt 7 supplied by encoder 12a; counter 14 is set of 0. If the position of article 2 on belt 4 is correct (i.e. the article can be properly received by a recess 80), the value corresponding to step 128 of encoder 12a is present on the output of latch 11. Said value is also present at the output of adder 13, as output signal of counter 14 at that instant is 0. No error signal is generated at the converter output.

When an irregularity in the article arrival occurs, the value stored in latch 11 and transferred to the output of adder 13 is no longer 128 but a higher or lower value according to whether a lag or a lead in the article arrival has occurred. A lag will be considered, such that said value is for instance 131. That value gives rise to a positive error signal at the output of converter 16, which signal is amplified by amplifier 17 and added to the signal supplied by tachometer 19 in control members 18 of motor 5. An acceleration of belt 4 takes place proportional to the error signal, and the article 2 is brought slightly forward.

As a consequence of said acceleration, the rate of the pulses arriving at the input for backward counting of counter 14 is higher than that of the pulses arriving at the input for forward counting. The count issuing from the counter will become progressively more negative. When, because of the acceleration, the distance covered by belt 4 exceeds that covered by belt 7 by an amount corresponding to 1/256 of a revolution of the encoders, the output of counter 14 corresponds to a value $-1$. The adder output signal corresponds therefore to value 130. Said value still differs from the correct value, and an error signal is still generated, with an amplitude lower than the preceding error. That new error signal is added again to the speed of belt 7 in members 18, giving a new value to the speed of belt 4, slightly lower than the preceding speed. The article is still slightly brought forward. As soon as the difference between the distances covered by the two belts is again 1/256 of a recess, the output signal of counter 14 becomes $-2$ and that of the adder becomes 129. There is still a difference with respect to the correct value which causes a further adjustment of the speed of belt 4. As a consequence of said adjustment the output of adder will become again 128 resetting the error signal to 0. The article position on belt 4 is such that the article can be correctly transferred by belt 6 into a recess.

The same operations are carried out in case of a lead in the arrival of an article: in that case however the output of counter 14 will become more and more positive, as belt 4 is decelerated.

In the time elapsing between the arrival of two consecutive articles, counter 14 and adder 13 maintain belts 7 and 4 synchronized: in fact, in these conditions the output signal of latch 11 (present at output A of the adder) remains constant and a possible variation of the relative speeds of the two belts is detected in that the count of counter 13 progressively increases or decreases (always neglecting the oscillation by 1 unit); the error signal is thus generated and acts as described before. In the same manner adder 13 and counter 14 allow the attainment of an initial belt synchronization (in the absence of the link established through tachometer 19) or an improvement of the synchronization obtained by the tachometer.

Figure 3:
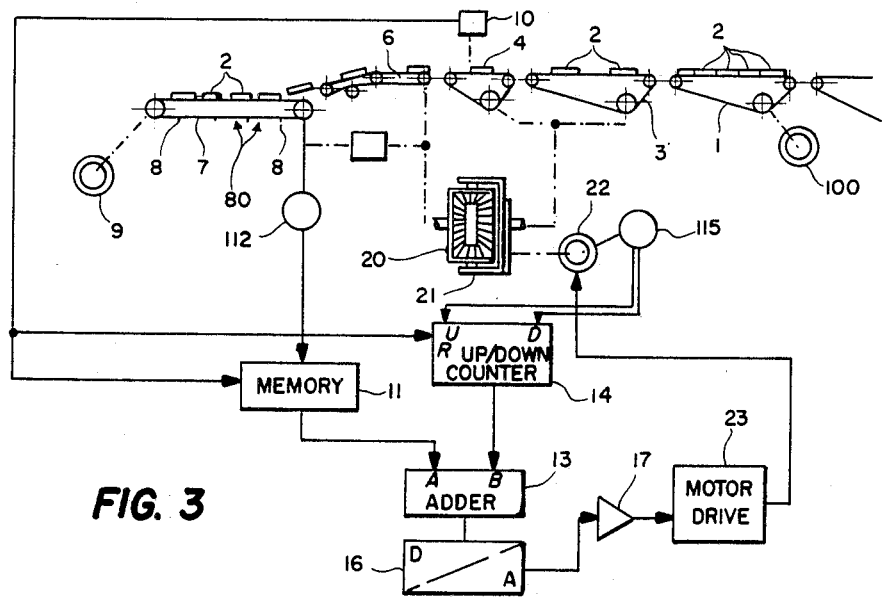
FIGS. 3 and 4 schematically show feeding groups of packing machines equipped wtih two alternative embodiments of the invention.

In the embodiment shown in FIG. 3, belt 4 is driven by motor 9 through a differential gear 20, the planet gears of which are carried by a bell member 21 which can be rotated by a low inertia d.c. motor 22, similar to motor 5. The control members 23 of said motor (for instance the same used as control members 18 in the embodiment of FIG. 1) are driven by the error signal. Motor 22, and hence bell 21, are kept stationary as long as the articles arrive regularly, whereas when an irregularity occurs motor 22 is rotated in either direction depending on whether a lag or a lead has occurred in the article arrival.

In order to generate the error and feedback signals photocell 10, latch 11, encoders 112, 115 associated with belt 7 and bell 21 (or motor 22), respectively, and digital-to-analog converter 16 followed by amplifier 17 are provided.

Encoder 112 is an absolute encoder like encoder 12a in FIG. 1 and is connected, like encoder 12a, to latch 11 enabled by the signal emitted by photocell 10 at the arrival of an article on belt 4. Encoder 115 is an incremental encoder like encoder 15: since in the present embodiment it is associated with a member rotatable in either direction, it will be equipped with the circuitry indicating the direction of the rotation. That circuitry is a conventional ancillary equipment of the incremental encoders and is supplied by the same manufacturers of the encoders. The revolutions of encoders 112 and 115 are divided into the same number of steps. Due to the presence of said circuitry, encoder 115 can emit pulses on either of two outputs according to the direction of rotation. Said outputs are connected to the two inputs of counter 14 which is reset by the signal coming from cell 10. By such an embodiment, the output of counter 14 will be a positive or a negative signal whenever motor 22 is actuated. The remaining part of the diagram is identical with that of FIG. 1.

The operation of such a variant embodiment is easily deducible by the above description: the error signal generated by converter 16 when the signal stored in latch 11 and fed to adder 13 does not indicate the wanted position (step 128), causes the actuation of bell 21 and differential gear 20 through motor 22 accelerating or decelerating belt 4 and displacing consequently article 2. The actuation of motor 22 (or the consequent rotation of the shaft of bell 21) make generator 115 emit pulses which are added to or subtracted from the stored value in adder 13, according to the direction of rotation. The error signal is progressively reset while the irregularity is being progressively corrected. As soon as the adder output indicates valve 128, motor 22 is stopped.

Figure 4:
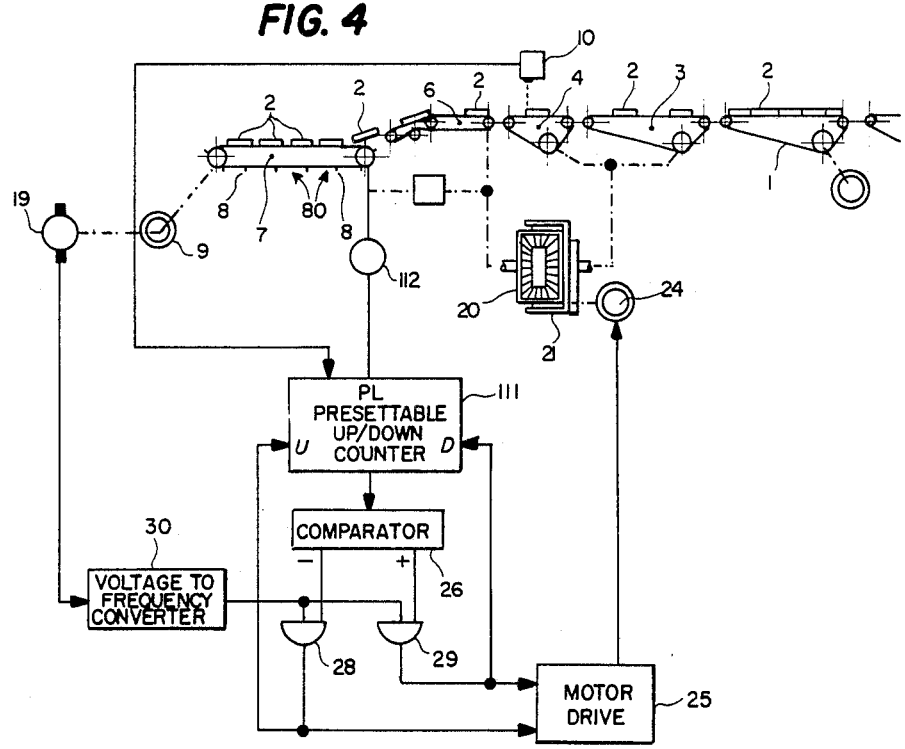

In the embodiment of FIG. 4, conveyor belt 4 is still driven by the motor of the packing machine through differential gear 20, identical to that of FIG. 3. In this case however bell 21 is mounted on the shaft of a step-by-step motor.

Belt 7 is associated with encoder 112, identical to that of FIG. 3 and connected to memory device 111 enabled by the signal coming from photocell 10. In this embodiment memory device 111 is also to receive the feedback signals and advantageously consists in a presettable up-down counter, of which the preset input is connected to encoder 112. The same component which has been used as counter 14 in the previous embodiments can be used as memory device 111. The output of device 111 is connected to an input of a comparator 26 (for instance Texas Instruments (7485) at a second input of which the correct position of belt 7 (value 128) is fixedly set. Comparator 26 is of a kind apt to signal whether the input values are different and which of said values is greater. In case a difference is detected, comparator 26 emits a signal on either of two outputs, denoted by − and + respectively, according to whether the constant value exceeds or is lower than the value received from device 111. The outputs are connected to an input of respective AND gates 28, 29, of which a second input is connected to the output of a pulse generator 30 emitting pulses at a rate depending on the speed of belt 7. That generator 30 may be for instance a voltage-to-frequency converter (for instance Raytheon 4151) connected to tachometer 19 associated with motor 9. The outputs of AND gates 28, 29 are connected to control members 25 (SLO-SYN type STM 103) of motor 24 and to the inputs for forward and backward counting of the counter which acts as memory device 111.

The operation of this embodiment is as follows:
when an article passes in correspondence with photocell 10, the value of the position of belt 7 is loaded into presettable counter 111 and fed to comparator 26. If that value is the same as that fixedly set to the other comparator input, the comparator outputs are inactive and keep AND gates 28, 29 disabled; motor 24 is not actuated. As soon as the value stored in counter 111 is no longer correct, a signal is emitted on one of the comparator outputs: for instance, if the value stored indicates a lag in the article arrival, the signal is present on output +. Consequently gate 29 is enabled and lets through the signal generated by converter 30 as error signal. Each pulse of that signal causes motor 24 to move forward by 1 step thereby accelerating belt 4 and moving forward the article. That signal is also fed to the backward counting input of device 111 and progressively decreases the preset value. When the output signal of counter 111 indicates again the correct value, the output of comparator 26 is no longer active, gate 29 is disabled and motor 24 is stopped. The opposite operations will be made in case of a lead in the arrival.

As an alternative, the feedback signals, instead of being the output signals of comparator 26, might be the signals emitted by an encoder like encoder 115 in FIG. 3 and associated with the step by step motor (or the shaft). The outputs of said encoder will be connected to the inputs for forward and backward counting of device 111. Such a generator is necessary only if the response time of step-by-step motor 24 is critical for the operation of the device. If such a response time leaves a sufficient margin of safety, the pulses for progressively annulling the error signal may be the pulses sent to the motor.

The above description has been given only by way of non limiting example and changes and modifications are possible without departing from the scope of the invention. For instance, the absolute encoders of FIGS. 1, 2, 4 can be each replaced by an incremental encoder and a counter. Moreover, a fraction of the error signal may be sent to members controlling the motor of one of the belts preceding belts 3, 4 (for instance motor 100, FIG. 1) to reduce irregularities in the arrival of articles onto belt 4.

What I claim is:
1. A method of controlling the transfer of articles from a first continuously moving endless conveyor belt having an upstream and a downstream and, to predetermine locations of a second downstream continuously moving conveyor belt, the first upstream belt including means for controlling the motion of the upstream belt, the method comprising the steps of: detecting the arrival of an article relative to a fixed location between the upstream end and the downstream end of the first upstream belt, generating a signal representing a position of the second downstream belt, storing said digital signal whenever the arrival of the article, relative to the fixed location, is detected, converting the stored signal into an error signal having an initial value representing the difference between the position of the downstream belt, whenever the arrival of an article relative to the fixed location is detected, and a predetermined position of the second downstream belt ensuring the correct transfer of an article into one of the said predetermined locations, said error signal being null value when there is no difference between said position of the downstream belt and said predetermined position, sending said error signal to the means for controlling the motion of the upstream belt, adjusting, temporarily, the speed of the upstream belt so as to excelerate or decelerate the upstream belt depending upon the value of said error signal, generating, at each adjustment of the speed of the upstream belt a digital feedback signal representing a correction of the upstream belt position relative to the downstream belt position due to said speed adjustment of the upstream belt, and annuling progressively, said error signal depending upon said generated feedback signal said upstream belt and said downstream belt are synchronized at the instant of article transfer.

2. A method as claimed in claim 1, wherein said error signal is generated by converting into analog form and amplifying a signal obtained as algebraic sum of the digital signal stored and of the feedback signal.

3. A method as claimed in claim 2, wherein said error signal is sent to control members of a motor continuously driving the upstream belt and is algebraically added to a signal representing the speed of the downstream belt, and wherein the feedback signal is obtained as output signal of a counter which is reset whenever the arrival of an article onto the upstream belt is detected, and counts forward and backward, respectively, pulses representing displacements of the downstream and upstream belts, respectively.

4. A method as claimed in claim 2, wherein said error signal is sent to control members of a motor for adjusting the speed of said upstream belt and acting on members transmitting the motion of the downstream to the upstream belt, and causes the rotation of said motor, and the feedback signal consists in pulses representing displacement of said motor.

5. A method as claimed in claim 1, wherein said error signal is generated by: comparing the digital signal stored with a signal representing said predetermined position; generating a pulse train having a rate depending on the speed of the downstream belt; and enabling, whenever said signals are different, the sending of said pulse train to control members of a step-by-step motor for adjusting the speed of the upstream belt and acting on members transmitting the motion of the downstream belt to the upstream belt.

6. A method according to claim 5, wherein said pulse train forms the feedback signal.

7. A method according to claim 5, wherein said feedback signal consists in a pulse train representing displacement of said step-by-step motor.

8. A device for controlling the transfer of articles from a first upstream continuously moving endless conveyor belt having an upstream end and a downstream end to selected locations on a second downstream continuously moving endless conveyor belt, said device comprising:

a detector associated with the first belt to detect the arrival of an article relative to a fixed location between the upstream and the downstream end of the first belt;

a first signal generator associated with the second belt and emitting digital siganls representing the position of said second belt;

memory means, having a data input connected to said first generator and an enable input connected to said detector, said memory unit storing said signal emitted by the first signal generator when at its enable input there is present a signal emitted by said detector and indicating the arrival of an article onto the first belt;

means for controlling the motion of the first belt;

error signal generating means connected to said memory unit for receiving therefrom the digital signal stored, for recognizing on the ground of said digital signal an incorrect position of an article on the first belt, for generating in the case of an incorrect position, an error signal and for sending said error signal to said means for controlling the motion of the first belt, said error signal causing a temporary adjustment of the speed of the first belt in a manner tending to recover the correct article positions;

means for generating, at each adjustment of the speed of the first belt, a feedback signal representing a correction of the upstream belt position relative to the downstream belt position due to said temporary adjustment of speed progressively annuling said error signal while the upstream and downstream belt position relative to each other is being corrected, so that the two belts are again synchronized at the instant of article transfer.

9. A device as claimed in claim 8, wherein said error signal generating means comprise an adder having a first input connected to the memory means for receiving therefrom the digital signal stored, a second input connected to the feedback signal generating means and an output on which there is present a signal obtained as algebraic sum of the signals present at said first and second inputs, the output of the adder being connected to a digital-to-analog converter which converts said sum signal into a bipolar signal and is followed by an amplifier emitting as output voltage said error signal.

10. A device as claimed in claim 8, wherein said feedback signal generating means comprises a first up-down counter having two inputs for forward and backward counting respectively, a reset input and an ouput, and in which said reset input is connected to said detector for resetting the counter whenever said detector emits a signal indicating the arrival of an article on the first upstream belt, said inputs for forward and backward counting are connected to a second and a third signal generator, respectively, which are associated with the downstream and the upstream belt, respectively, and emit pulses representing displacements of the associated belt, the counter output being connected to the error signal generating means.

11. A device as claimed in claim 9, wherein said upstream belt is driven by a motor, having control members to which the output of said amplifier is connected for feeding said control members with said error signal, and in that means are provided for generating and sending to said control members a signal representing the speed of the downstream belt for algebraic addition with the error signal.

12. A device as claimed in claim 9, wherein a differential gear transmits the motion of the downstream belt to the upstream belt, said differential gear having planets carried by a bell member mounted on a shaft rotatable by a motor having control members fed with said error signal which actuate the motor to rotate the shaft in either of two directions.

13. A device as claimed in claim 8 or 12, wherein the feedback signal generating means comprises a second up-down counter having a reset input and two further inputs for forward and backward counting, and in which the reset input is connectd to said detector for resetting the counter whenever said detector emits a signal indicating the arrival of an article on the upstream belt, and said further inputs are connected to a fourth signal generator associated with said motor or said shaft and emitting on a first and a second outputs pulses representing a forward or backward displacement of said motor or shaft, said pulses being fed to the inputs for backward and forward counting, respectively, of said second counter.

14. A device as claimed in claim 8 or 12, wherein said motor is a step by step motor, and said error signal generating means comprises: a fifth signal generator, emitting pulses having a rate depending of the speed of the downstream belt; comparison means, having a first input connected to said means for receiving therefrom the stored signal, a second input at which a digital signal representative of a position of the downstream belt suitable for the transfer of an article in one said predetermined location is fixedly set, and a first and a second output, said comparison means emitting a signal on either output according to whether the received signal exceeds or is lower than the fixedly set signal; gating means, connected to said fifth signal generator and to said comparision means and enabled to let through to a first or a second output the pulses emitted by said fifth signal generator according to whether a signal is present on said first or second output of the comparison means, the outputs of said gating means being connected to control members of said step-by-step motor to cause rotation of the motor in either direction.

15. A device according to claim 8, wherein said memory means is a presettable up-down counter having a parallel-load input connected to said first signal generator, a reset input connected to said detector and two further inputs for forward and backward counting, respectively, connected to means generating a feedback signal whenever said step-by-step motor is actuated.

16. A device according to claim 14, wherein said error signal generating means generate also a feedback signal tending to annul the error signal.

17. A device according to claim 15, wherein said feedback signal generating means comprise a sixth signal generator, associated with said step-by-step motor, and emitting on a first or a second output signals representing forward and backward displacements of said motor, said outputs being connected to the inputs for backward and forward counting, respectively, of said presettable counter.

* * * * *